3,013,888
Patented Dec. 19, 1961

3,013,888
GLASS COMPOSITION
Stéphane de Lajarte, Paris, France, assignor to
Compagnie de Saint-Gobain, Paris, France
No Drawing. Filed Nov. 6, 1959, Ser. No. 851,238
37 Claims. (Cl. 106—50)

This invention relates to a novel glass composition and to glass fibers made therefrom, and particularly relates to a glass composition having a low $B_2O_3$ content and/or a low content of $ZrO_2$ and $TiO_2$.

This application is a continuation-in-part of applications Serial Nos. 595,583 and 595,584, both filed July 3, 1956, both now abandoned.

The invention has as one of its objects the provision of a novel glass composition having a low speed of devitrification.

Another object of the invention recites in the provision of a glass composition having a viscosity in the neighborhood of 1000 poises between 1000 and 1200° C., whereby the material may easily be drawn into fibers.

Yet another object of the invention lies in the provision of a novel glass composition having a low rate of attackability by water.

Still another object of the invention is the provision of a glass composition which is advantageously used in the making of glass fibers, the composition being such that only a low temperature is required for its transformation to fibers, such composition having at most a very low speed of devitrification at fiber-making temperatures.

A further object of the invention is the provision of a novel article of manufacture in the form of glass fibers made of the above-indicated glass composition.

The above and further objects of the invention and further advantages of the glass composition and of glass fibers made therefrom will more readily appear in the following specification setting forth preferred examples of the glass composition of the invention.

The glass composition of the present invention consists essentially of from about 55 to 68% $SiO_2$, less than 5% $B_2O_3$, from about 7 to 10% CaO, from about 2 to 5% MgO, from about 11 to 14% alkali metal oxides, $ZrO_2$ and $TiO_2$ totaling less than 5%, and a minor amount of $Al_2O_3$, all percentages being by weight. In such composition the $SiO_2$, $B_2O_3$, CaO, MgO, $Al_2O_3$, $ZrO_2$, and $TiO_2$ are of such proportions that the weight ratio MgO/CaO lies between about 0.3 and 0.5, the weight ratio $CaO/SiO_2$ is less than about 0.16, the sum of the percentages of $SiO_2$, $ZrO_2$, and $TiO_2$ lies between about 55 and 68, and the sum of the percentages of $SiO_2$, $ZrO_2$, $TiO_2$, $B_2O_3$, and $Al_2O_3$ lies between about 67 and 72. Preferably the MgO content of the composition lies between 2.8 and 4.5.

The glass of the invention has the following broad range of composition:

Table I

| | Percent by weight |
|---|---|
| $SiO_2$ | 55–68 |
| BaO | 0–5 |
| $B_2O_3$ | 0–5 |
| $ZrO_2+TiO_2$ | 0–5 |
| $Al_2O_3$ | 3–9 |
| $Fe_2O_3$ | 0–6 |
| CaO | 7–10 |
| MgO | 2–5 |
| $Na_2O+K_2O$ | 11–14 |
| F | 0–4 |

As above indicated, the $SiO_2$, $B_2O_3$, CaO, MgO, $Al_2O_3$, $ZrO_2$, and $TiO_2$ of the composition of the invention have such proportions that the weight ratio MgO/CaO lies between about 0.3 and 0.5, the weight ratio $CaO/SiO_2$ is less than about 0.16, the sum of the percentages of $SiO_2$, $ZrO_2$, and $TiO_2$ lies between about 55 and 68, and the sum of the percentages of $SiO_2$, $ZrO_2$, $TiO_2$, $B_2O_3$, and $Al_2O_3$ lies between about 67 and 72.

As examples of permissible variation within the composition range set forth in Table I above, there are set forth below in Table II six illustrative subordinate ranges of the composition:

Table II

| | Percent by weight | | | | | |
|---|---|---|---|---|---|---|
| | A | | | | B | |
| | 1 | 2 | 3 | 4 | 5 | 6 |
| $SiO_2$ | 55–66 | 55–66 | 55–66 | 55–66 | 55–66 | 55–66 |
| BaO | 0–5 | 0–2 | 1–2 | 0–2 | 0–3 | 1–2 |
| $B_2O_3$ | 0–5 | 0–3 | 0–1.5 | 0–2 | 3–5 | 4.3–4.6 |
| $ZrO_2+TiO_2$ | 0.5–5 | 0.5–3.5 | 2.5–3.3 | 0.5–3.5 | | |
| $Al_2O_3$ | 3–9 | 3–9 | 3–9 | 6.8–8.3 | 3–9 | 3.5–5 |
| $Fe_2O_3$ | 0–6 | 0–6 | 0–6 | 4–6 | 0–6 | 0.1 |
| CaO | 7–9.5 | 7–9.2 | 7–9.5 | 7–8 | 7–9.5 | 9–9.5 |
| MgO | 2.8–4.5 | 3.3–4.5 | 2.8–4.5 | 3.5–4.5 | 2.8–4.5 | 3.7–4 |
| $Na_2O+K_2O$ | 12–14 | 11.5–14 | 11.5–14 | 11.5–14 | 11.5–14 | 11.5–13 |
| F | 0–4 | 0–3 | 0–3 | 0–3 | 0–4 | 0–3 |

The compositions in columns 1, 2, 3, and 4 of Table II above are illustrative of compositions A lying in one subordinate field within the broad composition set forth in Table I, and the compositions shown in columns 5 and 6 in Table II above are illustrative of compositions B within another subordinate field of the broad composition. In the compositions B of columns 5 and 6 of Table II, $B_2O_3$ is present and there is no $TiO_2+ZrO_2$. In the compositions A illustrated by columns 1 to 4, inclusive, of Table II, on the other hand, there need be no $B_2O_3$ present, but there is an effective amount of $ZrO_2+TiO_2$. The broad range of $ZrO_2+TiO_2$ is 0.5–5 (column 1), the combined percentage of $ZrO_2$ and $TiO_2$ is preferably less than 3.5 (columns 2, 3, and 4 of Table II), and in certain preferred composition such sum lies between 2.5 and 3.3 (column 3 of Table II).

On occasion, as shown in Table II above, glass compositions in accordance with the invention may contain a small quantity of fluorine, less than 4%, particularly in cases where they contain at most only a small quantity of $B_2O_3$. The presence of fluorine in the amount indicated facilitates maintaining the temperature at which the composition has a viscosity of 1000 poises in the range 1000 to 1200° C.; the fluorine also maintains the speed of devitrification below the permitted maximum value.

Glass compositions in accordance with the invention may also include a small quantity of BaO, in general less than 5%, in order to reduce the viscosity of the glass. BaO has no appreciable effect upon the attackability of the glass by water and desirably reduces the speed of devitrification of the glass, as well as lowering the upper temperature of such devitrification.

It has been found particularly advantageous, in compositions having the sub-ranges set forth in columns 5 and 6 of Table II, to maintain the content of $B_2O_3$ between about 3 and 5%, and preferably between 4.3 and 4.6%. Such $B_2O_3$ contents, particularly the latter, allow attainment of a satisfactory viscosity of the glass in the range of working temperatures convenient for drawing glass fibers; such $B_2O_3$ content also limits the tendency to devitrification of the glass.

Glass compositions within the present invention have a speed of devitrification which is at most equal to 2 microns per minute. Such speed of devitrification corresponds to the greatest speed of growth of the crystals in the glass, each glass having a maximum speed of devitrification at one definite temperature. Glass compositions in accordance with the invention have a viscosity of 1000 poises in the temperature range 1000 to 1200° C. Further, such glass compositions have an attackability by water, measured according to the standards established by Deutsche Glastechnische Gesellschaft, which is at most equal to 10 mg.

Such attackability by water is measured by taking 4 cc. of glass ground so that it passes through a screen having 45–50 meshes/in. and heating such ground glass for five hours at 100° C. in 100 cc. of water. The solution is now filtered and the filtrate is evaporated, after which the residue from the filtrate is heated to 150° C. and then is weighed. The resultant weight, expressed as mg. of residue per 100 cc. of water, measures the attackability of the glass by water.

By way of non-limiting examples, the analyses of eleven glass compositions in accordance with the invention, and their properties of attackability by water, devitrification and viscosity, are given in the following table:

Table III

| Analysis | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 65 | 60.4 | 59.6 | 59.1 | 56.2 | 55.9 | 55.7 | 62.0 | 59.3 | 58.1 | 57.7 | 64.0 | 62.1 | 61.4 |
| $SO_3$ | 0.2 | 0.4 | 0.3 | 0.4 | 0.3 | 0.3 | 0.2 | 0.3 | 0.1 | 0.1 | 0.1 | 0.3 | 0.1 | 0.1 |
| $TiO_2$ | 1.0 | | | | 1.5 | 1.5 | 1.5 | 2.0 | | | 4.2 | | | |
| $ZrO_2$ | | 3.1 | 3.3 | 2.5 | 1.7 | 1.8 | 1.8 | | 2.1 | 4.5 | | 4.0 | 4.6 | 4.5 |
| $B_2O_3$ | | | | | | 1.4 | 2.7 | 4.5 | 4.5 | 4.5 | 4.3 | 4.5 | 4.2 | 4.2 |
| $Al_2O_3$ | 8.0 | 8.1 | 8.3 | 7.8 | 7.8 | 7.1 | 6.8 | 3.5 | 4.2 | 4.6 | 4.3 | 3.5 | 0.5 | 0.6 |
| $Fe_2O_3$ | 1.0 | 1.1 | 1.1 | 1.0 | 5.3 | 5.1 | 5.0 | 0.3 | 0.6 | 0.6 | 0.5 | 0.3 | 0.1 | 0.1 |
| MnO | 0.2 | 0.2 | 0.2 | 0.2 | 0.1 | 0.1 | 0.1 | | 0.1 | 0.1 | 0.1 | | 0.1 | 0.1 |
| CaO | 8.0 | 7.7 | 7.7 | 7.8 | 7.1 | 7.2 | 7.0 | 9.0 | 9.2 | 9.1 | 9.2 | 9.0 | 9.4 | 9.2 |
| MgO | 2.8 | 3.3 | 3.3 | 3.6 | 4.1 | 4.3 | 4.2 | 4.0 | 3.7 | 3.6 | 3.7 | 4.0 | 3.8 | 3.7 |
| BaO | | 1.6 | 1.6 | 1.8 | 1.9 | 1.8 | 1.8 | 1.7 | 1.7 | 1.8 | 1.8 | 1.7 | 1.7 | 1.7 |
| $Na_2O$ | 11.0 | 10.6 | 11.1 | 12.8 | 12.6 | 12.3 | 12.6 | 12.1 | 11.6 | 10.7 | 11.6 | 12.1 | 10.6 | 11.6 |
| $K_2O$ | 2.0 | 2.0 | 2.0 | 1.9 | 0.7 | 0.6 | 0.6 | 0.5 | 0.8 | 0.9 | 0.8 | 0.5 | 0.8 | 0.8 |
| Fluorine | 3.0 | 2.6 | 2.6 | 1.9 | 1.5 | 1.5 | | | 3.0 | 2.8 | 2.4 | | 3.0 | 3.0 |
| Oxygen by calculation | −1.2 | −1.0 | −1.0 | −0.8 | −0.6 | −0.6 | | | −1.3 | −1.1 | −1.2 | | −1.3 | −1.3 |
| Attackability by water, mg | 8 | 3 | 5 | 6 | 8 | 8 | 8 | 7 | 7 | 8 | 6 | 7 | 9 | 9 |
| Devitrification: | | | | | | | | | | | | | | |
| Upper temperature limit, °C | 960 | 1,040 | 1,060 | 1,050 | 1,156 | 1,156 | 1,176 | 1,032 | 942 | 1,059 | 960 | 1,032 | 960 | 942 |
| Temperature of maximum speed of devitrification | 914 | 860 | 880 | 918 | 1,020 | 1,020 | 942 | 842 | 842 | 916 | 828 | 942 | 900 | 842 |
| Microns/minute | 0.3 | 0.6 | 0.5 | 0.5 | 2.0 | 2.0 | 1.8 | 1.5 | 0.9 | 0.8 | 0.6 | 1.5 | 0.9 | 0.9 |

Temperature, 0° C.

| Viscosity: | | | | | | | | | | | | | | |
|---|---|---|---|---|---|---|---|---|---|---|---|---|---|---|
| 10,000 poises | 1,025 | 1,025 | 1,015 | 995 | 960 | 950 | 955 | 970 | 905 | 908 | 920 | 970 | 918 | 905 |
| 1,000 poises | 1,195 | 1,195 | 1,175 | 1,150 | 1,105 | 1,090 | 1,090 | 1,100 | 1,043 | 1,040 | 1,050 | 1,100 | 1,060 | 1,043 |

The above analyses indicate the presence of small quantities of substances such as $SO_3$ and MnO. It would appear that such impurities are brought into the composition by the starting ingredients; in any event they have no appreciable action on the properties of the glass compositions obtained.

Glass compositions in accordance with the invention may contain a small quantity, less than 5% of $TiO_2$ and/or $ZrO_2$, as indicated in columns 1–4, inclusive, of Table II and in columns 1–11, inclusive, of Table III. In general the sum of the percentages of $TiO_2$ and $ZrO_2$ lies between 3.5 and 4.5, and preferably lies between 4.0 and 4.2%. Such materials decrease the attackability of the glass by water without appreciably modifying its viscosity and devitrification properties.

Glass compositions in accordance with the invention containing $B_2O_3$ and $TiO_2$ and/or $ZrO_2$ have compositions lying within the following:

Table IV

Percent by weight

| | |
|---|---|
| $SiO_2$ | 55–66 |
| $B_2O_3$ | 3–5 |
| $ZrO_2+TiO_2$ | 3.5–4.5 |
| $Al_2O_3$ | 3.5–5 |
| $Fe_2O_3$ | 0–1 |
| CaO | 9–9.5 |
| MgO | 3.7–4 |
| BaO | 1–2 |
| $Na_2O+K_2O$ | 11.5–13 |
| F | 0–3 |

Glass compositions in accordance with the invention may be employed in a number of different manners. They may advantageously be employed for the manufacture of glass fibers as by use of known centrifugal machines wherein the glass fibers are drawn or extruded from dies in refractory containers under the influence of centrifugal force. The glass compositions of the invention are particularly useful in forming fibers by this method by reason of the comparatively low temperature which they require for their transformation into fibers, and because their speed of devitrification at the fibre drawing or forming temperature is, for all practical purposes, zero. Such glass compositions may also be used to advantage in the making of molded or pressed glass articles which desirably posses a low attackability by water.

Whereas for purposes of illustration I have disclosed preferred embodiments of the glass composition of the invention, and preferred uses for such composition, it is to be understood that such examples and applications are illustrative only. The invention is, therefore, to be defined by the claims appended hereto.

What is claimed is:
1. A glass having the following composition in percent by weight:

| | |
|---|---|
| $SiO_2$ | 55–68 |
| BaO | 0–5 |
| $B_2O_3$ | 0–5 |
| $ZrO_2+TiO_2$ | 0–5 |
| $Fe_2O_3$ | 0–6 |
| MgO | 2–5 |
| MgO | 2–5 |
| $Na_2O+K_2O$ | 11–14 |
| F | 0–4 | and a minor amount of $Al_2O_3$, all percentages being by weight, the $SiO_2$, $B_2O_3$, CaO, MgO, $Al_2O_3$, $ZrO_2$, and $TiO_2$ having such proportions in the composition that the weight ratio MgO/CaO lies between about 0.3 and 0.5, the weight ratio $CaO/SiO_2$ is less than about 0.16, the sum of the percentages of $SiO_2$, $TiO_2$, and $ZrO_2$ lies between about 55 and 68, and the sum of the percentages of $SiO_2$, $TiO_2$, $ZrO_2$, $B_2O_3$, and $Al_2O_3$ lies between about 67 and 72.

2. A glass in accordance with claim 1 in which the $Al_2O_3$ content lies between 3 and 9% by weight.

3. A glass composition consisting essentially of the following: from about 55 to 68% $SiO_2$, less than 5% $B_2O_3$, from about 7 to 10% CaO, from about 2 to 5% MgO, from about 11 to 14% alkali metal oxides, and a minor amount of $Al_2O_3$, all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

4. A glass composition consisting essentially of the following: from about 55 to 68% $SiO_2$, from 3 to 5% $B_2O_3$, from about 7 to 10% CaO, from about 2 to 5% MgO, from about 11 to 14% alkali metal oxides, and a minor amount of $Al_2O_3$, all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

5. A glass composition consisting essentially of the following: from about 55 to 68% $SiO_2$, from about 4.3 to 4.6% $B_2O_3$, from about 7 to 10% CaO, from about 2 to 5% MgO, from about 11 to 14% alkali metal oxides, and a minor amount of $Al_2O_3$, all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

6. A glass composition consisting essentially of the following: from about 55 to 68% $SiO_2$, less than 5% $B_2O_3$, from about 7 to 10% CaO, from about 2.8 to 4.5% MgO, from about 11 to 14% alkali metal oxides, and a minor amount of $Al_2O_3$, all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

7. A glass composition consisting essentially of the following: from about 55 to 68% $SiO_2$, less than 5% $B_2O_3$, from about 7 to 10% CaO, from about 2 to 5% MgO, from about 11 to 14% alkali metal oxides, a minor amount of $Al_2O_3$, and less than 5% ($TiO_2+ZrO_2$), all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

8. A glass composition consisting essentially of the following: from about 55 to 68% $SiO_2$, less than 5% $B_2O_3$, from about 7 to 10% CaO, from about 2 to 5% MgO, from about 11 to 14% alkali metal oxides, a minor amount of $Al_2O_3$, and between about 3.5 and 4.5% ($TiO_2+ZrO_2$), all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

9. A glass composition consisting essentially of the following: from about 55 to 68% $SiO_2$ less than 5% $B_2O_3$, from about 7 to 10% CaO, from about 2 to 5% MgO, from about 11 to 14% alkali metal oxides, a minor amount of $Al_2O_3$, and between about 4.0 and 4.2% ($TiO_2+ZrO_2$), all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

10. A glass composition consisting essentially of the following: from about 55 to 66% $SiO_2$, from about 3 to 5% $B_2O_3$, from about 3 to 9% $Al_2O_3$, from about 7 to 9.5% CaO, from about 2.8 to 4.5% MgO, and from about 11.5 to 14% alkaline metal oxides, all percentages being by weight.

11. A glass composition consisting essentially of the following: from about 55 to 66% $SiO_2$, from about 3 to 5% $B_2O_3$, from about 3 to 9% $Al_2O_3$, less than 6% $Fe_2O_3$, from about 7 to 9.5% CaO, from about 2.8 to 4.5% MgO, less than 3% BaO, from about 11.5 to 14% ($Na_2O+K_2O$), less than 4% F, and from about 3.5 to 4.5% ($ZrO_2+TiO_2$), all percentages being by weight.

12. A glass composition consisting essentially of the following: from about 55 to 66% $SiO_2$, from about 3 to 5% $B_2O_3$, from about 3 to 9% $Al_2O_3$, from about 7 to 9.5% CaO, from about 2.8 to 4.5% MgO, and from about 11.5 to 14% ($NaO+K_2O$), all percentages being by weight.

13. A glass composition consisting essentially of the following: from about 55 to 66% $SiO_2$, from about 4.3 5% $B_2O_3$, from about 3 to 9% $Al_2O_3$, less than 6% $Fe_2O_3$, from about 7 to 9.5% CaO, from about 2.8 to 4.5% MgO, less than 3% BaO, from about 11.5 to 14% ($Na_2O+K_2O$), and less than 4% F, all percentages being by weight.

14. A glass composition consisting essentially of the following: from about 55 to 66% $SiO_2$, from about 4.3 to 4.6% $B_2O_3$, from about 3.5 to 5% $Al_2O_3$, from about 9 to 9.5% CaO, from about 3.7 to 4% MgO, from about 1 to 2% BaO, and from about 11.5 to 13% ($Na_2O+K_2O$), all percentages being by weight.

15. A glass composition consisting essentially of the following: from about 55 to 66% $SiO_2$, from about 4.3 to 4.6% $B_2O_3$, from about 3.5 to 5% $Al_2O_3$, less than about 1% $Fe_2O_3$, from about 9 to 9.5% CaO, from about 3.7 to 4% MgO, from about 1 to 2% BaO, from about 11.5 to 13% ($Na_2O+K_2O$) and less than about 3% F, all percentages being by weight.

16. A glass composition consisting essentially of the following: from about 55 to 66% $SiO_2$, from about 3 to 5% $B_2O_3$, from about 3.5 to 5% $Al_2O_3$, from about 9 to 9.5% CaO, from about 3.7 to 4% MgO, from about 1 to 2% BaO, from about 11.5 to 13% ($Na_2O+K_2O$), and from about 3.5 to 4.5% ($ZrO_2+TiO_2$), all percentages being by weight.

17. A glass composition consisting essentially of the following: from about 55 to 66% $SiO_2$, from about 3 to 5% $B_2O_3$, from about 3.5 to 5% $Al_2O_3$, less than about 1% $Fe_2O_3$, from about 9 to 9.5% CaO, from about 3.7 to 4% MgO, from about 1 to 2% BaO, from about 11.5 to 13% ($Na_2O+K_2O$), not more than about 3% F, and from about 3.5 to 4.5% ($ZrO_2+TiO_2$), all percentages being by weight.

18. A glass composition consisting essentially of the following: from about 55 to 68% $SiO_2$, from about 3 to 9% $Al_2O_3$, from about 7 to 10% CaO, from about 2 to 5% MgO, from about 11 to 14% ($Na_2O+K_2O+Li_2O$), from a small but effective amount to 5% $B_2O_3$, from 0 to 4.5% ($ZrO_2+TiO_2$), from 0–4% BaO, and from 0 to 12% $Fe_2O_3$, all percentages being by weight.

19. A glass composition as defined in claim 21, wherein the weight ratio of CaO to $SiO_2$ is less than .16.

20. A glass composition consisting essentially of the following:

| | Percent by weight |
|---|---|
| $SiO_2$ | 55 to 68 |
| $Al_2O_3$ | 3 to 9 |
| CaO | 7 to 9.5 |
| MgO | 2.8 to 4.5 |
| ($Na_2O+K_2O$) | 11.5 to 14 |
| $B_2O_3$ | 3 to 5 |
| ($ZrO_2+TiO_2$) | 0 to 4.5 |
| BaO | 0 to 3 |
| $Fe_2O_3$ | 0 to 6 |

21. Glass composition as defined in claim 20 wherein the weight ratio of CaO to $SiO_2$ is less than .16.

22. A glass composition as defined in claim 21 comprising:

| | Percent by weight |
|---|---|
| $SiO_2$ | 55 to 66 |
| $Na_2O$ | 11.5 to 14 |
| $Fe_2O_3$ | about 0.1 |

23. A glass composition consisting essentially of the following: from about 55 to 66% $SiO_2$, less than 5% $B_2O_3$, from about 7 to 10% CaO, from about 2 to 5% MgO, from about 11 to 14% alkali metal oxides, $ZrO_2$ and $TiO_2$ totaling less than 5%, and a minor amount of $Al_2O_3$, all percentages being by weight, the $SiO_2$, $B_2O_3$, CaO, MgO, $Al_2O_3$, $ZrO_2$, and $TiO_2$ having such proportions in the composition that the weight ratio MgO/CaO lies between about 0.3 and 0.5, the weight ratio $CaO/SiO_2$ is less than about 0.16, the sum of the percentages of $SiO_2$, $TiO_2$, and $ZrO_2$ lies between about 55 and 68, and the sum of the percentages of $SiO_2$, $TiO_2$, $ZrO_2$, $B_2O_3$, and $Al_2O_3$ lies between about 67 and 72.

24. A glass composition consisting essentially of the following: from about 55 to 66% $SiO_2$, from about 7 to 10% CaO, from about 2 to 5% MgO, from about 11 to 14% alkali metal oxides, $ZrO_2$ and $TiO_2$ totaling between about 2.5% and 3.5%, and a minor amount of $Al_2O_3$, all percentages being by weight, the $SiO_2$, CaO, MgO, $Al_2O_3$, $ZrO_2$, and $TiO_2$ having such proportions in the composition that the weight ratio MgO/CaO lies between about 0.3 and 0.5, the weight ratio $CaO/SiO_2$ is less than about 0.16, the sum of the percentages of $SiO_2$, $TiO_2$, and $ZrO_2$ lies between about 55 and 68, and the sum of the percentages of $SiO_2$, $TiO_2$, $ZrO_2$, and $Al_2O_3$ lies between about 67 and 72.

25. A glass composition consisting essentially of the following: from about 55 to 66% $SiO_2$, from about 0.5 to 5% ($ZrO_2+TiO_2$), from about 3 to 9% $Al_2O_3$, from about 7 to 9.5% CaO, from about 2.8 to 4.5% MgO, and from about 11.5 to 14% alkali metal oxides, all percentages being by weight.

26. A glass composition consisting essentially of the following: from about 55 to 66% $SiO_2$, from about 2.5 to 3.3% ($ZrO_2+TiO_2$), from about 3 to 9% $Al_2O_3$, from about 7 to 9.5% CaO, from about 2.8 to 4.5% MgO, from about 1 to 2% BaO, and from about 11.5 to 14% ($Na_2O+K_2O$), all percentages being by weight.

27. As an article of manufacture, glass fibers having the following composition in percent by weight:

| | |
|---|---|
| $SiO_2$ | 55–68 |
| BaO | 0–5 |
| $B_2O_3$ | 0–5 |
| $ZrO_2+TiO_2$ | 0–5 |
| $Fe_2O_3$ | 0–6 |
| CaO | 7–10 |
| MgO | 2–5 |
| $Na_2O+K_2O$ | 11–14 |
| F | 0–4 |

28. Glass fibers in accordance with claim 27, in which the $Al_2O_3$ content lies between 3 and 9% by weight.

29. As an article of manufacture, glass fibers having essentially the following composition: from about 55 to 66% $SiO_2$, less than 5% $B_2O_3$, from about 7 to 10% CaO, from about 2 to 5% MgO, from about 11 to 14% alkali metal oxides, and a minor amount of $Al_2O_3$, all percentages being by weight, the CaO, MgO, $SiO_2$, and $Al_2O_3$ having such proportions in the composition that the weight ratio MgO/CaO lies between about 0.3 and 0.5, the weight ratio $CaO/SiO_2$ is less than about 0.16, and the sum of the percentages of $SiO_2$, $B_2O_3$, and $Al_2O_3$ lies between about 67 and 72.

30. As an article of manufacture, glass fibers having essentially the following composition: from about 55 to 66% $SiO_2$, from about 3 to 5% $B_2O_3$, from about 3 to 9% $Al_2O_3$, less than 6% $Fe_2O_3$, from about 7 to 9.5% CaO, from about 2.8 to 4.5% MgO, less than 3% BaO, from about 11.5 to 14% ($Na_2O+K_2O$), less than 4% F, and from about 3.5 to 4.5% ($ZrO_2+TiO_2$), all percentages being by weight.

31. As an article of manufacture, glass fibers having essentially the following composition: from about 55 to 66% $SiO_2$, from about 3 to 5% $B_2O_3$, from about 3 to 9% $Al_2O_3$, from about 7 to 9.5% CaO, from about 2.8 to 4.5% MgO, and from about 11.5 to 14% ($Na_2O+K_2O$), all percentages being by weight.

32. As an article of manufacture, glass fibers having essentially the following composition: from about 55 to 66% $SiO_2$, from about 4.3 to 4.6% $B_2O_3$, from about 3.5 to 5% $Al_2O_3$, from about 9 to 9.5% CaO, from about 3.7 to 4% MgO, from about 1 to 2% BaO, and from about 11.5 to 13% ($Na_2O+K_2O$), all percentages being by weight.

33. As an article of manufacture, glass fibers having essentially the following composition: from about 55 to 66% $SiO_2$, from about 3 to 5% $B_2O_3$, from about 3.5 to 5% $Al_2O_3$, from about 9 to 9.5% CaO, from about 3.7 to 4% MgO, from about 1 to 2% BaO, from about 11.5 to 13% ($Na_2O+K_2O$), and from about 3.5 to 4.5% ($ZrO_2+TiO_2$), all percentages being by weight.

34. As an article of manufacture, glass fibers having essentially the following composition: from about 55 to 66% $SiO_2$, less than 5% $B_2O_3$, from about 7 to 10% CaO, from about 2 to to 5% MgO, from about 11 to 14% alkali metal oxides, $ZrO_2$ and $TiO_2$ totaling less than 5%, and a minor amount of $Al_1O_3$, all percentages being by weight, the $SiO_2$, $B_2O_3$, CaO, MgO, $Al_2O_3$, and $TiO_2$ having such proportions in the composition that the weight ratio MgO/CaO lies between about 0.3 and 0.5, the weight ratio $CaO/SiO_2$ is less than about 0.16, the sum of the percentages of $SiO_2$, $TiO_2$ and $ZrO_2$ lies between about 55 and 68, and the sum of the percentages of $SiO_2$, $TiO_2$, $ZrO_2$, $B_2O_3$, and $Al_2O_3$ lies between about 67 and 72.

35. As an article of manufacture, glass fibers having essentially the following composition: from about 55 to 66% $SiO_2$ from about 0.5 to 5% ($ZrO_2+TiO_2$), from about 3 to 9% $Al_2O_3$, less than 6% $Fe_2O_3$, from about 7 to 9.5% CaO, from about 2.8 to 4.5% MgO, less than 5% BaO, from about 11.5 to 14% ($Na_2O+K_2O$), and less than 4% F, all percentages being by weight.

36. As an article of manufacture, glass fibers having essentially the following composition: from about 55 to 66% $SiO_2$, from about 2.5 to 3.3% ($ZrO_2+TiO_2$), from about 3 to 9% $Al_2O_3$, less than 6% $Fe_2O_3$, from about 7 to 9.5% CaO, from about 2.8 to 4.5% MgO, from about 1 to 2% BaO, from about 11.5 to 14% ($Na_2O+K_2O$), and less than 3% F, all percentages being by weight.

37. As an article of manufacture, glass fibers having essentially the following composition: from about 55 to 66% $SiO_2$, from about 0.5 to 3.5% ($ZrO_2+TiO_2$), from about 6.8 to 8.3% $Al_2O_3$, from about 4 to 6% $Fe_2O_3$, from about 7 to 8% CaO, from about 3.5 to 4.5% MgO, less than 2% BaO, from about 11.5 to 14% ($Na_2O+K_2O$), less than 3% F, all percentages being by weight.

References Cited in the file of this patent

UNITED STATES PATENTS

| | | |
|---|---|---|
| 2,443,142 | Lyle | June 8, 1948 |
| 2,640,784 | Tiede et al. | June 2, 1953 |
| 2,664,359 | Dingledy | Dec. 29, 1953 |
| 2,756,158 | Hahn et al. | July 24, 1956 |

FOREIGN PATENTS

| | | |
|---|---|---|
| 1,137,393 | France | May 28, 1957 |

OTHER REFERENCES

Glastechnische Tabellen, Eitel-Pirani-Scheel, 1932 ed., pages 661–663.

UNITED STATES PATENT OFFICE
CERTIFICATE OF CORRECTION

Patent No. 3,013,888            December 19, 1961

Stéphane de Lajarte

It is hereby certified that error appears in the above numbered patent requiring correction and that the said Letters Patent should read as corrected below.

Column 4, line 61, for "MgO----2-5" read -- CaO----7-10 --; column 6, line 21, for "4.3" read -- 3 to --; column 8, line 10, for "14% Na$_2$O+K$_2$O)" read -- 14% (Na$_2$O+K$_2$O) --; line 29, strike out "to", second occurrence; line 31, for "Al$_1$O$_3$" read -- Al$_2$O$_3$ --; line 42, after "SiO$_2$" insert a comma.

Signed and sealed this 1st day of May 1962.

(SEAL)
Attest:

ERNEST W. SWIDER            DAVID L. LADD

Attesting Officer            Commissioner of Patents